United States Patent [19]
Harkness et al.

[11] Patent Number: 5,211,923
[45] Date of Patent: May 18, 1993

[54] HYDROGEN AND SULFUR RECOVERY FROM HYDROGEN SULFIDE WASTES

[75] Inventors: John B. L. Harkness, Naperville; Anthony J. Gorski, Woodridge; Edward J. Daniels, Oak Lawn, all of Ill.

[73] Assignee: University of Chicago, Chicago, Ill.

[21] Appl. No.: 739,029

[22] Filed: Aug. 1, 1991

[51] Int. Cl.$^5$ ............................................ C01B 17/16
[52] U.S. Cl. ................................ 423/220; 423/573.1; 423/644; 423/DIG. 10; 204/157.43; 204/157.44; 204/157.49; 204/157.52
[58] Field of Search ............ 423/DIG. 10, 644, 573.1, 423/220; 204/157.43, 157.44, 157.49, 157.52

[56] References Cited

U.S. PATENT DOCUMENTS

| | | | |
|---|---|---|---|
| 4,076,607 | 2/1978 | Zavitsanos et al. | 204/162 R |
| 4,302,434 | 11/1981 | Hellmer et al. | 423/573 G |
| 4,332,781 | 6/1982 | Lieder et al. | 423/573 G |
| 4,439,412 | 3/1984 | Behie et al. | 423/573 G |
| 4,695,446 | 9/1987 | Bogdanovic | 423/648 R |
| 4,999,178 | 3/1991 | Bowman | 423/571 |

OTHER PUBLICATIONS

Recovery of Hydrogen and Sulfur From Hydrogen Sulfide Wastes Presented Aug. 1, 1990 at the Industry Working Group Meeting Bldg 362 Argonne National Laboratory, Argonne, Illinois.

Hydrogen Sulfide Waste Treatment by Microwave Plasma Dissociation by John B. L. Harkness, Anthony J. Gorski and Edward J. Daniels presented at 25th Intersociety Energy Coversion Engineering Conf. Aug. 12–17 1990.

Dissociation of Hydrogen Sulfide in a Plasma by A. V. Balebanov et al., Doklady Physical Chemistry pp. 709–712.

Effect of Spatial Nonequilibrium in the Dissociation of Hydrogen Sulfide in a Nonuniform Plasma pp. 592–594 Jul. 1985.

Primary Examiner—Gary P. Straub
Assistant Examiner—Timothy C. Vanoy
Attorney, Agent, or Firm—Emrich & Dithmar

[57] ABSTRACT

A process for generating hydrogen and elemental sulfur from hydrogen sulfide waste in which the hydrogen sulfide is associated under plasma conditions and a portion of the hydrogen output is used in a catalytic reduction unit to convert sulfur-containing impurities to hydrogen sulfide for recycle, the process also including the addition of an ionizing gas such as argon to initiate the plasma reaction at lower energy, a preheater for the input to the reactor and an internal adjustable choke in the reactor for enhanced coupling with the microwave energy input.

21 Claims, 4 Drawing Sheets

HYDROGEN AND SULFUR RECOVERY FROM HYDROGEN SULFIDE WASTES

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to the treatment of hydrogen sulfide wastes to produce hydrogen in addition to sulfur and more particularly to a process characterized by energy savings, decreased levels of impurities and other benefits.

Significant quantities of hydrogen sulfide as a waste stream are produced in the refining industry where "sour" hydrocarbon feedstocks are upgraded by treatment with hydrogen usually obtained from a reforming process. The overall operation results in the consumption of large amounts of hydrogen while producing similar levels of hydrogen sulfide. A similar situation exists in the natural gas production industry where $H_2S$ must be removed from the crude gas and then disposed of. Furthermore, hydrogen sulfide produced in the metals refining industry could also be treated by this invention.

The current treatment technology for hydrogen sulfide waste is based on the Claus chemistry which depends on the mutual reduction/oxidation between sulfur dioxide and hydrogen sulfide to produce water and elemental sulfur.

However, the Claus chemistry requires a second stage of the waste-treatment process commonly identified as the "tail-gas clean-up" process (e.g., SCOT or Beavon) to convert sulfur-containing impurities (such as $COS$, $CS_2$, $SO_2$ and sulfur aerosol) back into hydrogen sulfide for recycle to the Claus unit. This "tail-gas clean-up" process requires an additional reducing reagent and additional energy requirements. Unconverted impurities are burned to form $SO_2$ which is then emitted to the environment.

Industry has investigated several alternatives to the Claus chemistry in order to recover the hydrogen used for the sweetening process but none have reached the commercial stage. These alternatives have included direct thermal decomposition, chemically promoted thermal decomposition, electrolysis, a combination of electrolysis and chemical decomposition, and liquid metal conversion. While each of the alternatives produced hydrogen instead of water, they were abandoned because of poor yields, high energy costs or process limitations. Accordingly, a major interest remains to develop a combined hydrogen and sulfur recovery process for hydrogen sulfide waste treating.

Recently, a technology has been introduced at the development stage to treat hydrogen sulfide waste under plasma conditions which dissociate hydrogen sulfide into hydrogen and sulfur. A general description may be found in "Hydrogen Sulfide Waste Treatment by Microwave Plasma Dissociation" by John B. L. Harkness, Anthony J. Gorski and Edward J. Daniels, Presented at the 25th Intersociety Energy Conversion Engineering Conference on August 12-17, 1990, Reno Nevada, and in the Soviet literature as represented by "Dissociation of Hydrogen Sulfide in a Plasma" by A. V. Balebanov, et al., Doklady Physical Chemistry, Proceedings of Academy of Sciences of the USSR, Translated from Doklady Akademii Nauk SSSR, 282(3):675-660 (July 1985) and "Effect of Spatial Nonequilibrium in the Dissociation of Hydrogen Sulfide in a Nonuniform Plasma" by V. D. Rusanov et al., Soviet Physical Doklady 30(7); 592-594 (July 1985). FIG. 1 represents a general flow diagram of the process. As illustrated, a sour gas, such as would be produced by an amine purification unit, is fed to a plasma reactor where a plasma is generated with microwave or radio-frequency energy. Cooling water is fed to the power supply to limit the temperature. The product stream from the plasma unit includes hydrogen, sulfur and various impurities including $COS$, $CS_2$, $SO_2$ and $CO$ as well as $CO_2$ and $H_2O$ contained in the original sour gas. The product sulfur is condensed and sulfur aerosols are removed in the sulfur scrubber by action of a liquid sulfur spray with the sulfur less a portion for recycle being removed.

Steam is also produced as illustrated. Hydrogen, unconverted $H_2S$, $CO_2$, $H_2O$, and the impurities are removed as an overhead stream from the scrubber and fed to a compressor which provides sufficient pressure to return this stream to an existing purification unit (prior to the plasma reactor) as represented by an amine purification process.

As indicated, the new technology is primarily in the developmental stage although providing several advantages. Hydrogen is generated in the process which may limit the need for a reformer to supply hydrogen for the hydrodesulfurizer operation. Energy requirements are also lowered and environmental emissions are decreased. In a natural gas production facility, the hydrogen produced could be used as an auxiliary fuel or sold. However, further improvements in the process are needed.

One object of this invention is one or more improvements in a process to generate hydrogen and elemental sulfur from hydrogen sulfide. Other objects will be apparent from the following description.

SUMMARY OF THE INVENTION

This invention is directed to a process for generating hydrogen and elemental sulfur from hydrogen sulfide under plasma conditions using a unique internal purification stage using a portion of hydrogen in the output stream together with a catalyst to convert the sulfur-containing impurities to hydrogen sulfide which may be recycled. Advantageously, the conversion step is carried out after the sulfur removal stage and before the compressor. In the conversion or purification step, the overhead stream from the scrubber is fed into a vessel containing a catalyst such as cobalt molybdate in a fixed bed. The presence of hydrogen in the output stream together with the catalyst is sufficient to convert sulfur-containing impurities to hydrogen sulfide which may be recycled to the plasma unit. The catalyst for the hydrogeneration may be based on iron oxide, chromia-alumina, copper-chromia-alumina cobalt molybdate, copper-chromium-vanadium oxide or the like.

Advantageously, the catalytic-reduction step includes the addition of water to produce the shift conversion of carbon monoxide in the stream to produce additional hydrogen and carbon dioxide.

As further improvements for the plasma reactor, the invention includes the addition of an easily ionized gas such as argon at a concentration sufficient to initiate the plasma reaction at a lower energy. Suitably, the amount is at least about 0.01% with the upper limit being about 10.0%. Preferably, the amount is in the range of about 1.0-5.0%. The cavity in which the plasma is generated in the reactor is also made tuneable with an internally adjustable choke. This improves the coupling of the microwave (or RF) energy and the plasma without requiring an adjustment in an outer endplate which would be subject to leaks. A further improvement is a preheat of the hydrogen sulfide input stream to the reactor to improve the dissociation of the hydrogen sulfide.

DETAILED DESCRIPTION OF THE PREFERRED EMBODIMENT

Figure 1:
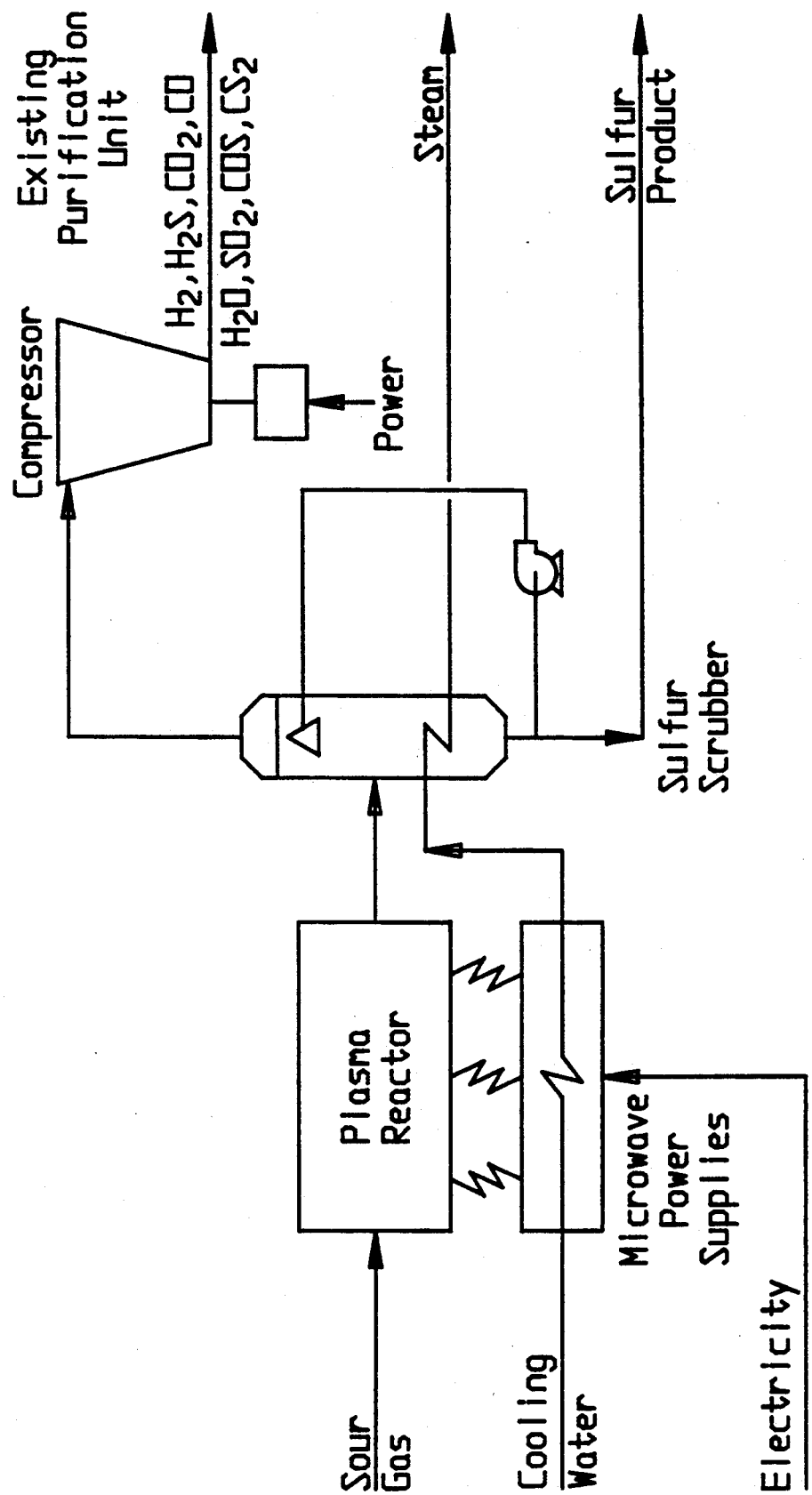
FIG. 1 is a flow diagram of the plasma process without the invention.
Figure 2:
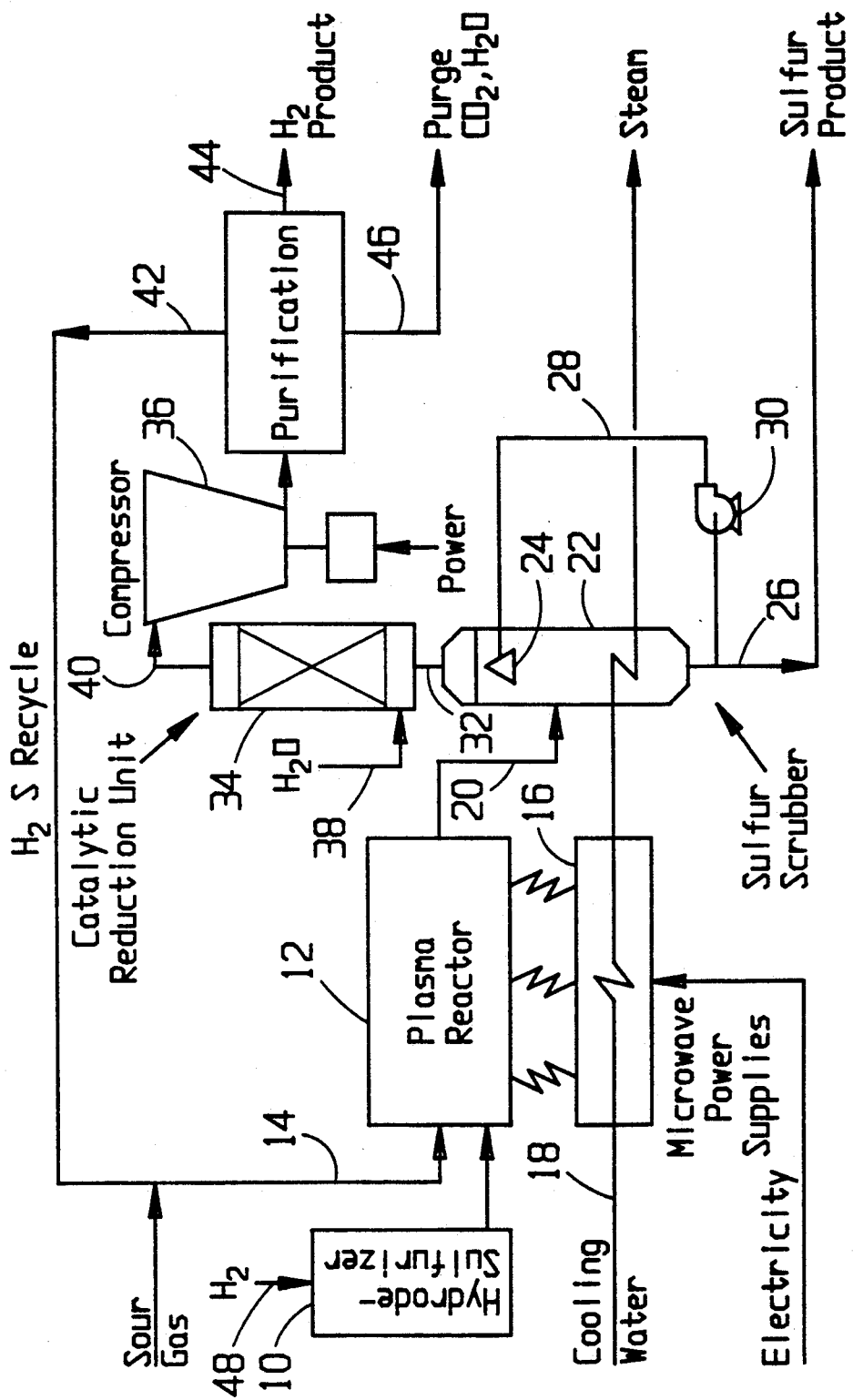
FIG. 2 is a flow diagram of one embodiment of the invention with a catalytic reduction unit.
Figure 4:
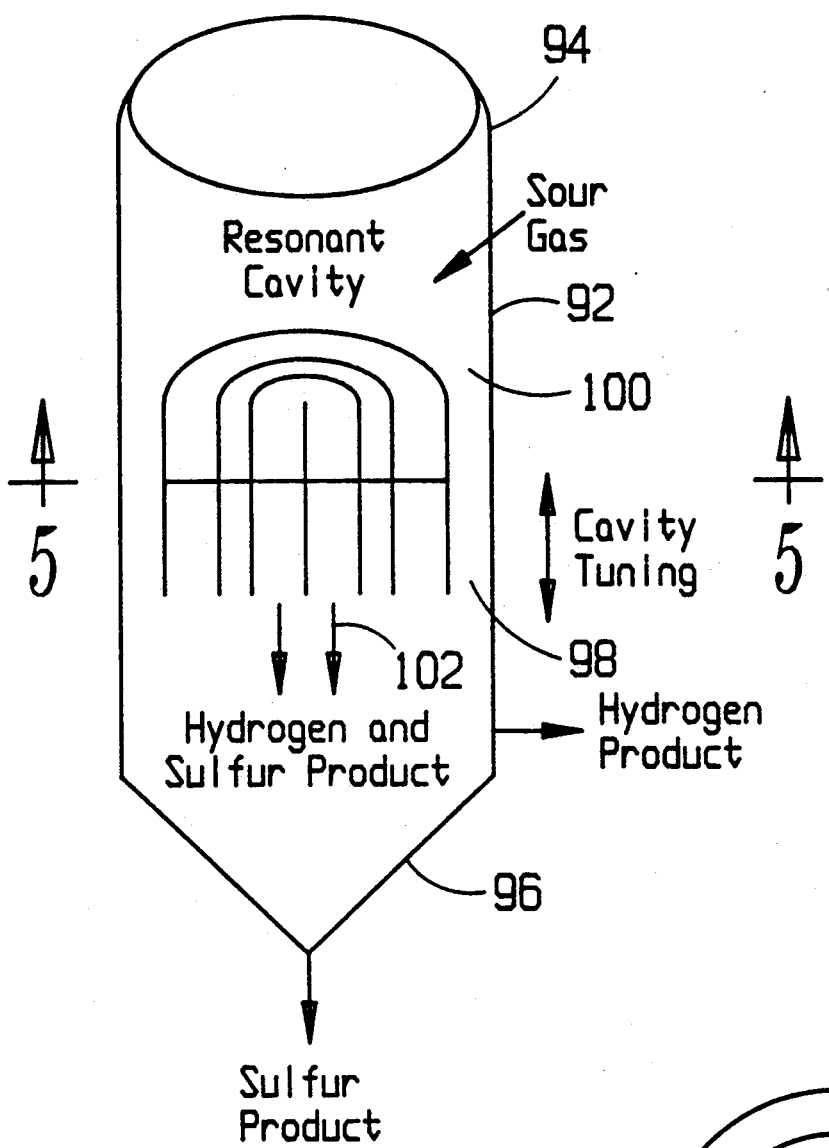
FIG. 4 is a schematic of a third embodiment of the invention showing an adjustable cavity in the plasma reactor.
Figure 5:
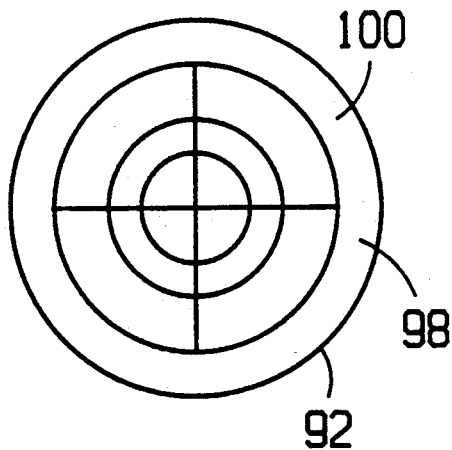
FIG. 5 is a cross sectional view of the adjustable cavity in the plasma reactor shown in FIG. 4 taken along sightline 5-5 therein.

As illustrated in FIG. 2, a sour gas from hydrodesulfurizer 10 (including an amine purification) containing hydrogen sulfide in the general range of about 30 to 99% is fed to plasma reactor 12 as generally illustrated in FIG. 4. Additional hydrogen sulfide is provided by recycle line 14 as separated in the purification unit. The feed may also include $CO_2$ and $H_2O$ and hydrocarbons at general levels of up to 1% Microwave energy from a power supply 16 cooled by water from line 18 is fed to the reactor 12 to generate a Plasma to dissociate the hydrogen sulfide into hydrogen and sulfur plus impurities which typically include COS, $CS_2$, $SO_2$, sulfur aerosol, and CO. This stream will also contain various amounts of unreacted $CO_2$ and $H_2O$. Suitable plasma conditions are 0.5-2.0 atm. and 150°-450° C. An output product of hydrogen, sulfur and the impurities are fed by line 20 to a sulfur scrubber 22 where an overhead spray 24 of liquid sulfur serves to condense the sulfur into a liquid stream for removal at the bottom of the scrubber by line 26. A portion of the sulfur is recycled by line 28 and pump 30. Typical temperatures and pressures in the scrubber are 120°-250° C. and 0.5-2.0 atmospheres.

The sulfur product from the scrubber is removed to storage. Hydrogen, $H_2S$, $CO_2$, and $H_2O$, and including the impurities (about 0.5 to 5.0%) are removed in an overhead stream 32 from the scrubber. Those impurities include COS, $CS_2$, $SO_2$, a sulfur aerosol and CO. Previously, the overhead would be compressed to facilitate purification of the hydrogen for subsequent use. However, the presence of the impurities in the overhead is a potential problem for the compressor in that some are corrosive and the sulfur aerosol represents an erosion hazard to the equipment. Accordingly, the improved process of FIG. 2 includes a catalytic reduction unit 34 between the sulfur scrubber 22 and compressor 36 to convert the sulfur-containing impurities to hydrogen sulfide which avoids these problems and simplifies the final hydrogen purification step. Advantageously, water is added by line 38 to the overhead at or before the catalytic reduction unit 34 for a shift conversion of carbon monoxide to carbon dioxide with hydrogen produced in the process. Suitably, the conditions for the reduction include a pressure and temperature in the range of about 0.5 to 2 atm. and 120°-250° C., respectively. The catalyst used is effective for reducing the sulfur-containing gases with hydrogen to hydrogen sulfide. Only a small percentage of the hydrogen in the stream is required for tho conversion of the major portion of the impurities.

The stream 40 from the catalytic reduction unit is then fed to compressor 36 to increase the pressure from about 0.5-2.0 to about 5-10 atmospheres. This enhances the final purification step which may be carried out by pressure absorption, membrane separation or the like. In the purification step, hydrogen sulfide, hydrogen and any remaining impurities are separated into streams 42, 44 and 46. Hydrogen sulfide may be recycled to the feed stream for the plasma reactor 12 while hydrogen may be removed as a product or recycled by line 48 to the hydrodesulfurizer. Without the impurities, the hydrogen stream has enhanced value for recycle.

Figure 3:
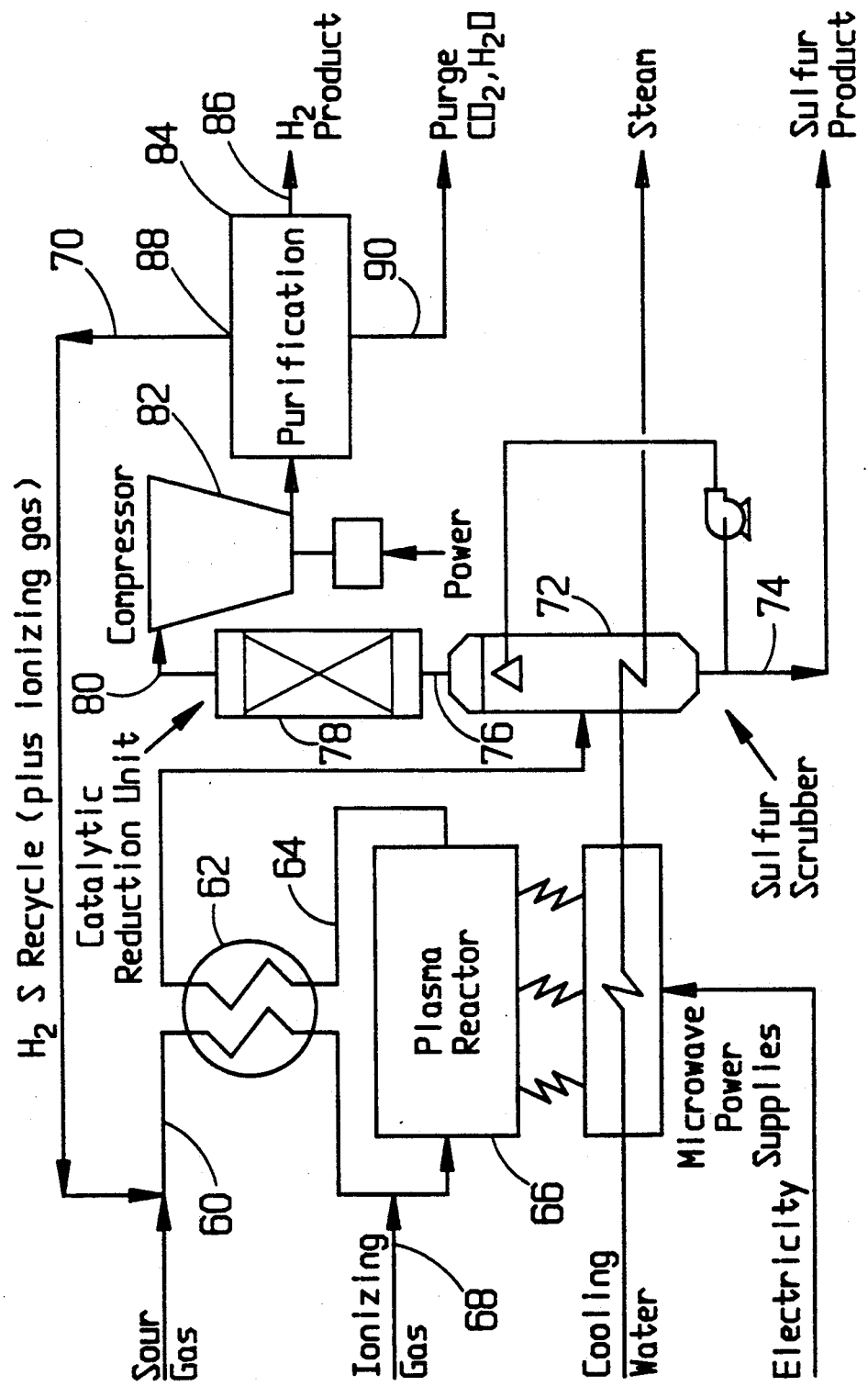
FIG. 3 is a flow diagram of a second embodiment of the invention with the catalytic reduction unit and the addition of an ionizing gas and a preheat of the inlet stream of hydrogen sulfide wastes.

FIG. 3 is the flow diagram of FIG. 2 with two separate process enhancements: first a preheater for the input stream for the reactor and second the addition of an ionizing gas for the plasma reactor. Preferably, the reactor output is used to provide heat for the input. Suitably, the temperature of the input stream is increased from about 50° C. to between 100° and 500° C. This decreases plasma microwave energy requirements by increasing the energy levels of the input molecules. Advantageously, the input stream 60 is preheated in a heat exchanger 62 using the output stream 64 to increase the input temperature. This would offset energy losses of the microwave energy converted into thermal energy to heat the contents of the reactor. Suitable ionizing gases introduced to the reactor 66 by line 68 include argon, helium and krypton. Amounts range from an amount sufficient (i.e., 0.01 to 10%) to lower dissociation energies about 10 to 25%. The ionizing gas will allow the use of a lower activation energy for the incoming fresh hydrogen sulfide and yields in some instances will be increased. Following the reactor stage, the ionizing gas and unreacted hydrogen sulfide are separated for recycling by line 70 to the plasma reactor. Other than the use of the preheater and the addition of an ionizing gas, the process of FIG. 3 remains as described for FIG. 2. The output 64 of the reactor is fed to scrubber 72 where a sulfur product is recovered through line 74 with the overhead 76 being fed to catalytic reduction unit 78. The stream 80 with reduced impurities is then fed to the compressor 82 and to the purification unit 84 where hydrogen, hydrogen sulfide (and ionizing gas) and impurities are separated into streams 86, 88 and 90.

FIG. 4 provides a sketch of the longitudinal and cross-sectional view of an improved plasma reactor 92 with a sealed upper endplate 94, a lower funnel 96 for sulfur removal and an internal choke 98 which is adjustable. Previous efforts to adjust cavities in plasma reactors have involved movement of endplates which has caused problems of leakage and flow of the components. As illustrated, the choke 98 is designed as a multi-cylinder structure 100 with a concentric set of openended cylinders 102 to allow for the free-flow of liquid sulfur. The spacing and lengths of these cylinders are determined by the standard design rules for microwave chokes. With open spaces 104 between the cylinders and reactor wall, liquid sulfur product will flow past the internal choke into the lower isolated section of the reactor designed to separate the liquid and gas products. Movement of the internal choke provides an adjustment of the cavity to improve performance of the process. This feature allows the plasma reactor to be tuned to achieve maximum coupling between the plasma and the input microwave or radio-frequency energy over a wide range of process conditions.

This process can be operated over a relatively wide range of conditions. The sour gas feed in FIGS. 2-3 is typically at or slightly above the dew point of the preceding amine purification process located in the main stream of either a refinery or a natural-gas purification plant. This translates into a $H_2O$ content of about 5% in the sour gas. On the other hand, $CO_2$ contents depend entirely on its concentration in the hydrocarbon stream being purified by the amine unit. Its sour gas composition can vary from as low as 5% to as high as 60%. The balance of this stream is hydrogen sulfide with, perhaps, a trace of hydrocarbons. This gas can be piped directly to a plasma reactor powered by either microwave energy or a radio-frequency discharge. Plasmas can be obtained at pressures as low as 0.03 atm or as high as 3 atm. For safety, the lower operating condition should be no lower than 0.5 atm, preferably 1 atm. The main constraint on the upper operating limit is the energy losses associated with denser gases. Preferably the process would operate in the 1.0-1.5 atm range.

Plasmas can be obtained with microwave frequencies ranging from 300 mHz to 2.45 GHz at power levels of 0.5-1.5 kW per standard cubic meter of hydrogen sulfide. The lower frequencies are more amenable to industrial scales of equipment while the higher frequencies are most suited to laboratory operations. The lower frequencies also offer the advantage of higher electrical conversion efficiencies and lower capital costs. Generally speaking, the lower the plasma operating pressure the less energy is lost to heating the product gases. At a pressure of 0.5 atm. the product gases should be comfortably above the 120° C. melting point of sulfur so th product should not plug up the plasma reactor exit. At higher pressures more energy would be required to maintain the desired hydrogen sulfide conversion and the gas temperatures could rise to the 400°-500° C. range. This would begin to represent an economic loss if energy recovery measures were not taken. However, by preheating the input gas with the product stream, the microwave energy requirements of the dissociation reactions would be relaxed and thereby minimize the economic penalty of the higher pressure operation.

As described above, the purpose of the scrubber is to condense as much sulfur as feasible and to remove sulfur aerosols from the gas stream entering the compressor. In practice, the lower temperature operating limit on this process step should be kept comfortably above the sulfur melting point, preferably no lower than 125° C. Since sulfur aerosols are very difficult to remove, the addition of the catalytic reduction step offers a substantially higher degree of protection to the downstream equipment as well as simplifying their design and operation. In general, any hydrogen sulfide separated by the final purification step would be recycled to the plasma reactor to effectively destroy all the hydrogen sulfide contained in the original sour gas feed stream. This would leave only the $CO_2$ and $H_2O$ introduced in the sour gas stream to be purged from the plasma process. Product sulfur would be sold, as is currently done, and the hydrogen product would be available for reuse in a refinery, for sale or fuel use in a natural-gas facility, or for metal treating in the metal industry.

The embodiments of the invention in which an exclusive property or privilege is claimed are defined as follows:

1. A process for treating a gas stream which contains $CO_2$ and water and sulfur-containing compounds including hydrogen sulfide, comprising the steps of feeding the gas stream containing hydrogen sulfide to a plasma reactor for dissociating hydrogen sulfide under plasma conditions with RF energy to provide a product stream including hydrogen, sulfur, sulfur-containing compounds comprising one or more of COS, $CS_2$ or $SO_2$ and non-sulfur containing compounds, said plasma reactor being operated at a temperature in the range of from about 150° C. to about 450° C. and at a pressure in the range of from about 0.5 to about 2 atm, feeding the product stream to a sulfur recovery unit to remove essentially all of the sulfur therefrom leaving an overhead gaseous stream of hydrogen, unconverted $H_2S$, sulfur-containing and non-sulfur-containing compounds and a sulfur aerosol, feeding the overhead gaseous stream to a catalytic reduction unit for reacting the sulfur-containing compounds and sulfur aerosol with hydrogen in the overhead gaseous stream in the presence of a catalyst to form a hydrogen sulfide enhanced stream and to decrease the concentrations of sulfur-containing compounds and non-sulfur containing compounds, compressing the hydrogen sulfide enhanced stream, and subsequently separating hydrogen and hydrogen sulfide as final product streams.

2. The recess of claim 1 wherein the impurities include carbon monoxide and the process includes the addition of water to the catalytic reduction unit for a water shift reaction with carbon monoxide.

3. The process of claim 2 including the recycle of the separated hydrogen sulfide to the input stream fed to the plasma reactor.

4. The process of claim 1 wherein the separation of hydrogen and hydrogen sulfide includes the separation of remaining impurities.

5. The process of claim 4 wherein the separation is by membrane separation.

6. The process of claim 4 wherein the separated hydrogen stream is recycled to a hydrodesulfurizer.

7. The process of claim 1 including the addition of an ionizing gas to the plasma reactor to improve the dissociation of hydrogen sulfide, the addition being at a concentration sufficient to improve the dissociation.

8. The process of claim 7 wherein the ionizing gas is added to provide a concentration of at least about 0.05%.

9. The process of claim including a step of preheating the hydrogen sulfide stream fed to the plasma reactor.

10. The process of claim 9 wherein the preheating step is carried out with the product stream from the reactor.

11. The process of claim 1, wherein the plasma reactor includes an internal cavity and the process includes a step of adjusting the cavity to increase the energy efficiency of the process.

12. The process of claim 1, wherein the sulfur recovery unit is operated at a temperature in the range of from about 120° C. to about 250° C. and at a pressure in the range of from about 0.5 atm to about 2 atm.

13. The process of claim 1, wherein the catalytic reduction unit is operated at a temperature in the range of from about 120° C. to about 250° C. and at a pressure in the range of from about 0.5 atm to about 2 atm.

14. The process of claim 1, wherein the hydrogen sulfide enhanced stream is compressed at a pressure in the range of from about 5 atm to about 10 atm.

15. The process of claim 1, wherein the RF energy is in the microwave region.

16. A process for treating a gas stream which contains $CO_2$ and water and sulfur-containing compounds including hydrogen sulfide, comprising the steps of feeding the gas stream containing hydrogen sulfide and hydrogen to a plasma reactor for dissociating hydrogen sulfide under plasma conditions with RF energy to provide a heated product stream including hydrogen, sulfur, sulfur-containing compounds and non-sulfur-containing compounds, said plasma reactor being operated at a temperature in the range of from about 150° C. to about 450° C. and at a pressure in the range of from about 0.5 to about 2 atm, passing the heated product stream in heat exchange relationship with the gas stream prior to feeding the gas stream to the plasma reactor, thereby to heat the gas stream and cool the product stream, feeding the cooled product stream to a sulfur recovery unit to remove essentially all of the sulfur therefrom leaving an overhead gaseous stream of hydrogen, unconverted $H_2S$, sulfur-containing compounds comprising one or more of COS, $CS_2$ or $SO_2$ and non-sulfur-containing compounds and a sulfur aerosol, feeding the overhead gaseous stream to a catalytic reduction unit for reacting the sulfur-containing compounds and sulfur aerosol with hydrogen in the overhead gaseous stream in the presence of a catalyst to form a hydrogen sulfide enhanced stream and to decrease the concentrations of sulfur-containing compounds and non-sulfur containing compounds, compressing the hydrogen sulfide enhanced stream, and subsequently separating hydrogen and hydrogen sulfide as final product streams.

17. The process of claim 16, wherein the process is substantially free of excess water.

18. The process of claim 16, wherein the gas stream is heated in the range of from about 50° C. to about 500° C. by passing in heat exchange relationship with the heated product stream.

19. A process for treating a gas stream which contains $CO_2$ and water and sulfur-containing compounds including hydrogen sulfide, comprising the steps of feeding the gas stream containing hydrogen sulfide along with hydrogen and an ionizing gas selected from one or more of helium, argon, or krypton in the range of from about 0.01% to abut 10% by volume of the gas stream to plasma reactor for dissociating hydrogen sulfide under plasma conditions with RF energy to provide a heated product stream including hydrogen, sulfur, sulfur-containing compounds comprising one or more of COS, $CS_2$ or $SO_2$, non-sulfur containing compounds and ionizing gas, passing the heated product stream in heat exchange relationship with the gas stream prior to feeding the gas stream to the plasma reactor, thereby to heat the gas stream and cool the product stream, feeding the cooled product stream to a sulfur recovery unit to remove essentially all of the sulfur therefrom leaving an overhead gaseous stream of hydrogen, unconverted $H_2S$, sulfur-containing and non-sulfur-containing compounds and a sulfur aerosol, feeding the overhead gaseous stream to a catalytic reduction unit for reacting the sulfur-containing compounds and sulfur aerosol with hydrogen in the overhead gaseous stream in the presence of a catalyst to form a hydrogen sulfide enhanced stream and to decrease the concentrations of sulfur-containing and non-sulfur containing compounds, compressing the hydrogen sulfide enhanced stream, separating hydrogen and hydrogen sulfide plus the ionizing gas as final product streams, and recycling the hydrogen sulfide and the ionizing gas to the gas stream before feeding same to the plasma reactor, wherein the plasma reactor is operated at a temperature in the range of from about 150° C. to about 450° C. and at a pressure in the range of from about 0.5 to about 2 atm, the sulfur recovery unit is operated at a temperature in the range of from about 120° C. and at a pressure in the range of from about 0.5 atm to about 2 atm, and the catalytic reduction unit is operated at a temperature in the range of from about 120° C. to about 250° C. and at a pressure in the range of from about 0.5 atm to about 2 atm.

20. The process of claim 19, wherein the heated product stream leaving the plasma reactor has a temperature less than about 450° C. such that a portion thereof is liquid sulfur.

21. The process of claim 19, wherein the heated product stream is an acid gas containing $H_2S$ and one or more of COS, $CS_2$ and $SO_2$.

* * * * *

UNITED STATES PATENT AND TRADEMARK OFFICE
CERTIFICATE OF CORRECTION

PATENT NO. : 5,211,923
DATED : May 18, 1993
INVENTOR(S) : John B.L. Harkness, et al.

It is certified that error appears in the above-indentified patent and that said Letters Patent is hereby corrected as shown below:

Col. 6, line 1, "recess" should be --process--.

Column 6, line 1, after the word "claim", add --1--.

Column 8, line 7, "abut" should be --about--.

Signed and Sealed this

Twenty-fourth Day of May, 1994

Attest:

BRUCE LEHMAN

Attesting Officer    Commissioner of Patents and Trademarks